Aug. 9, 1960  J. H. WILSON  2,948,511
COMBINATION VEHICLE AND DRILLING RIG FRAME
Filed July 6, 1955  5 Sheets-Sheet 1
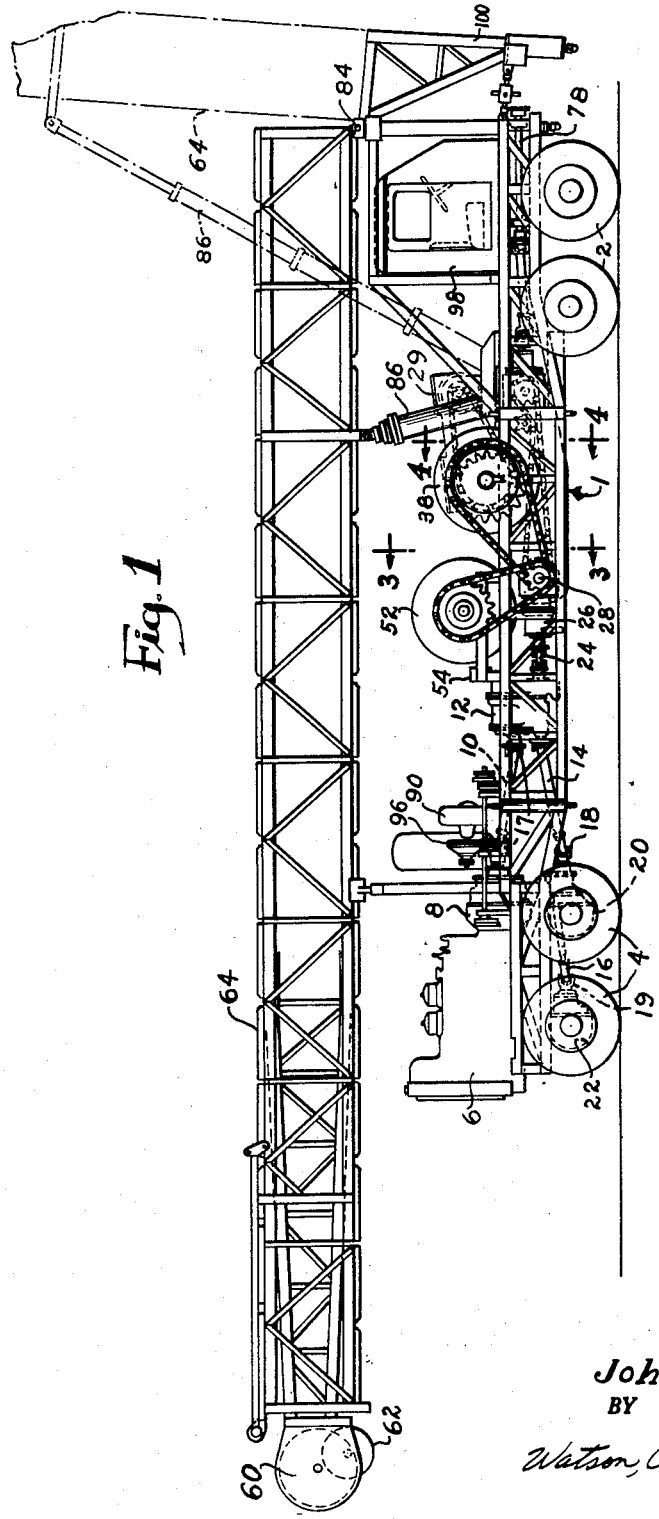
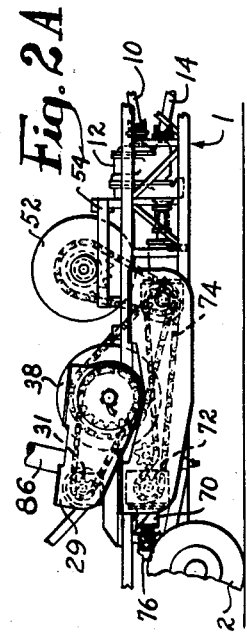
INVENTOR.
John Hart Wilson
BY
Watson, Cole, Grindle + Watson
Attys.

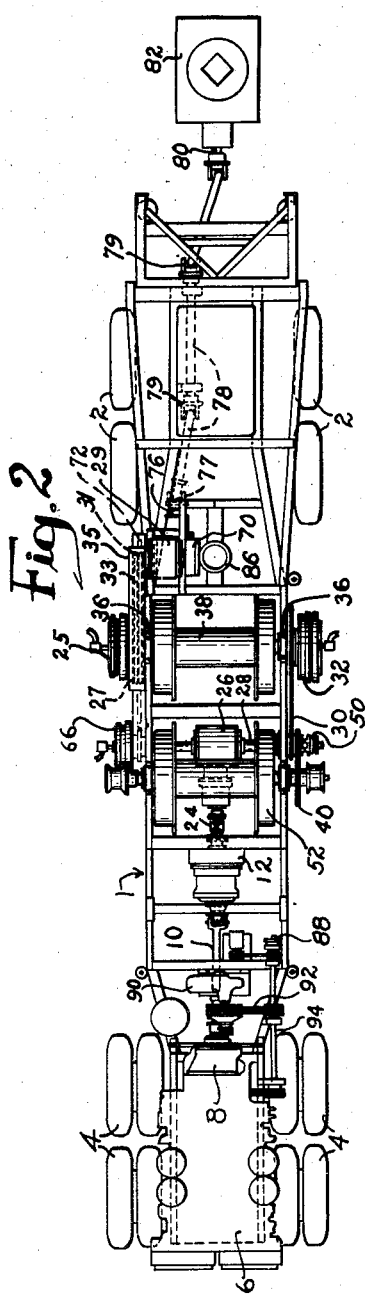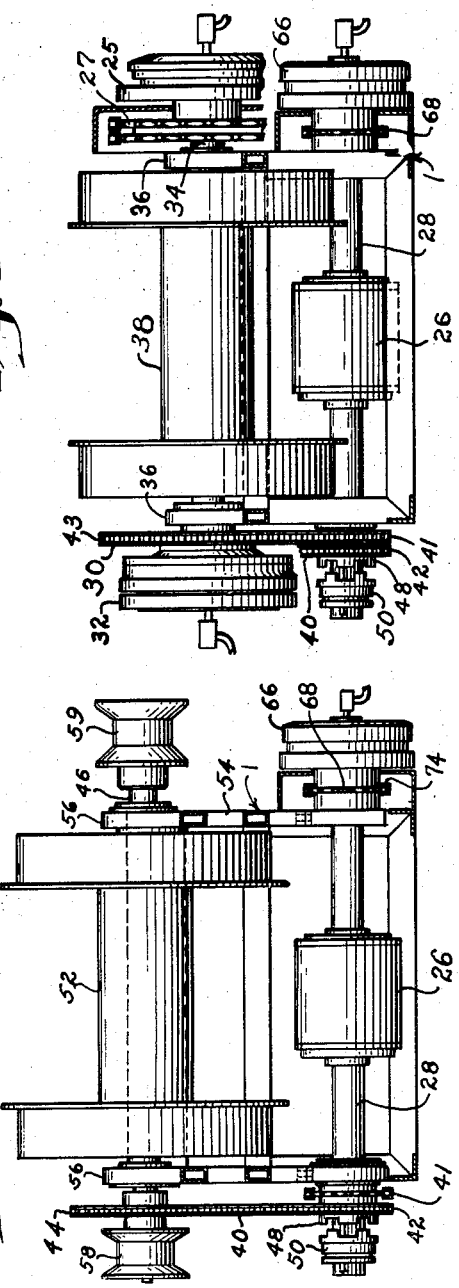

Aug. 9, 1960 J. H. WILSON 2,948,511
COMBINATION VEHICLE AND DRILLING RIG FRAME
Filed July 6, 1955 5 Sheets-Sheet 3
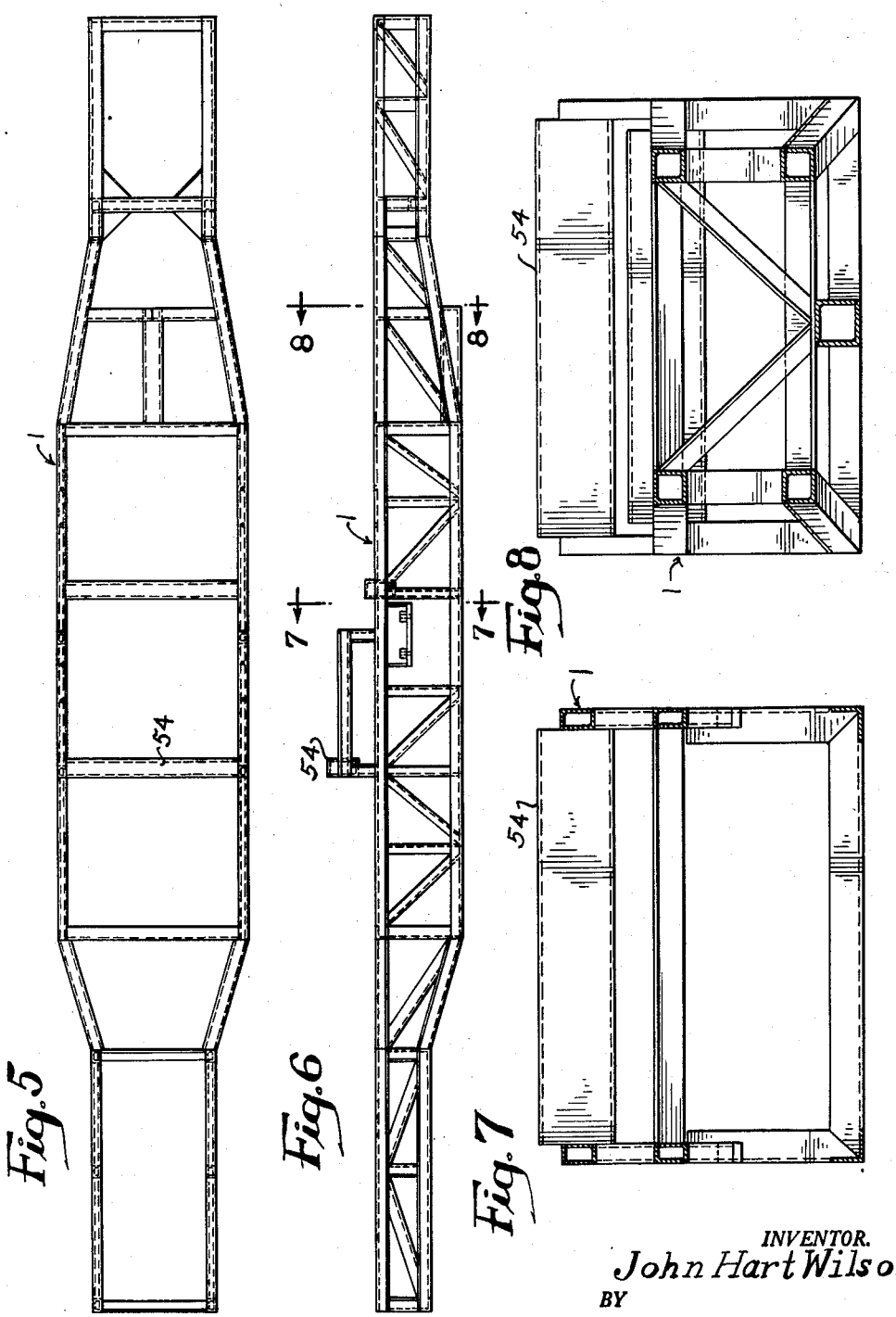
INVENTOR.
John Hart Wilson
BY
Watson, Cole, Grindle & Watson
Attys

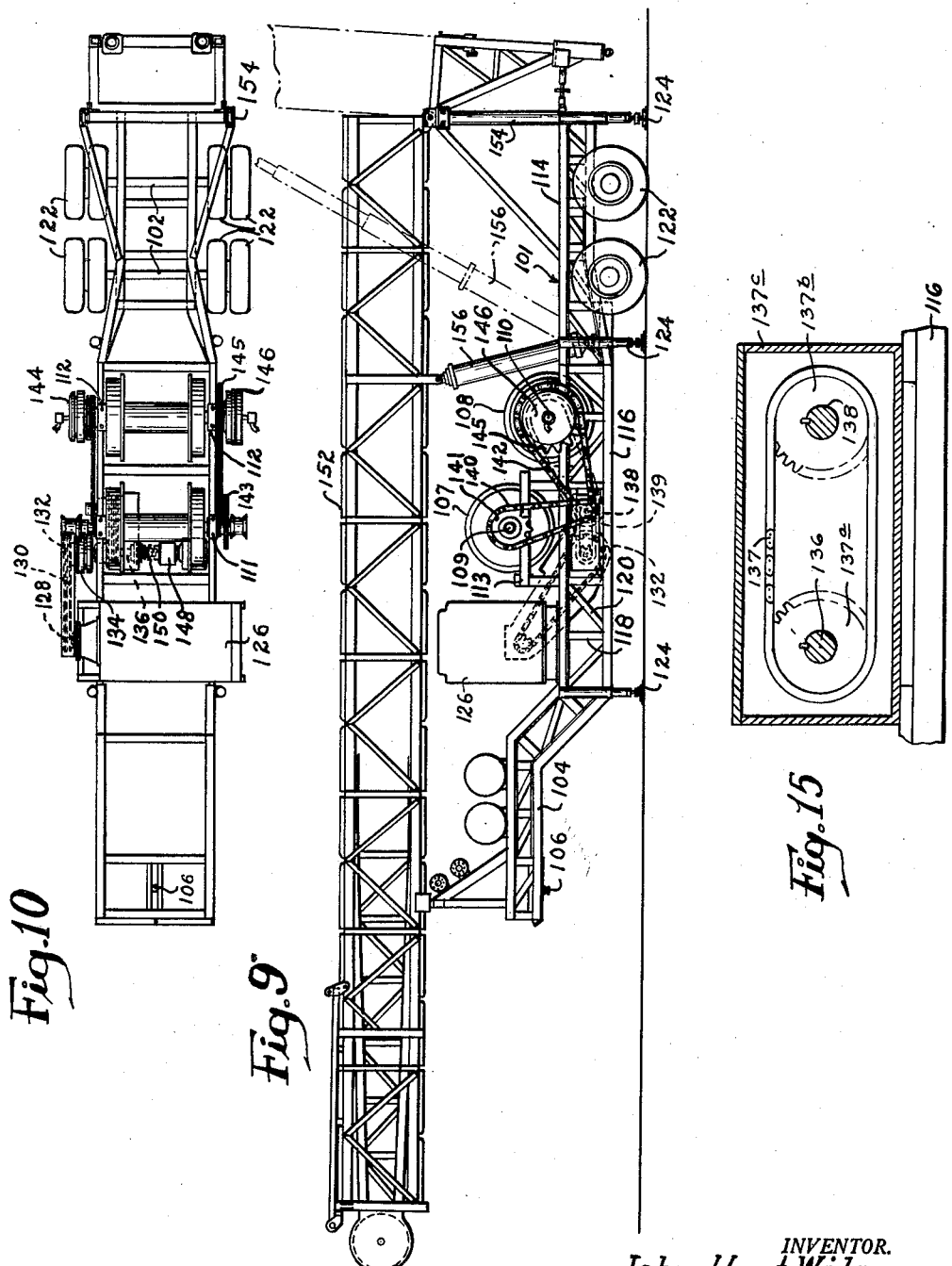

Aug. 9, 1960  J. H. WILSON  2,948,511
COMBINATION VEHICLE AND DRILLING RIG FRAME
Filed July 6, 1955  5 Sheets-Sheet 5
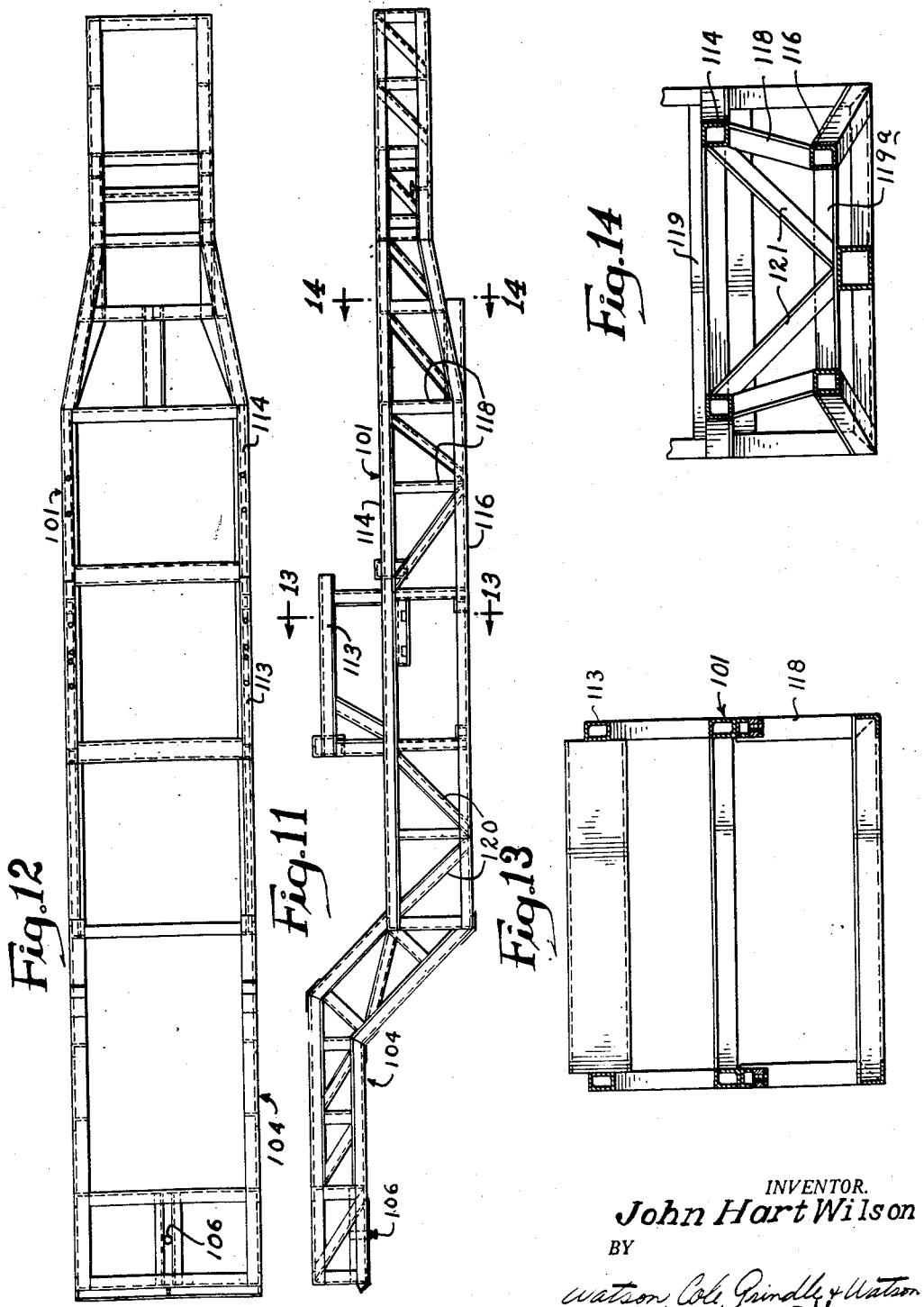
INVENTOR.
John Hart Wilson
BY
Watson, Cole, Grindle & Watson
Attys United States Patent Office 2,948,511
Patented Aug. 9, 1960

2,948,511

COMBINATION VEHICLE AND DRILLING RIG FRAME

John Hart Wilson, % Wilson Manufacturing Co. Inc., P.O. Box 1031, Wichita Falls, Tex.

Filed July 6, 1955, Ser. No. 520,233

3 Claims. (Cl. 254—166)

This invention relates to improvements in mobile drilling and oil well servicing rigs utilizing a hoisting drum and mast assembly, and more particularly to mobile drilling or oil well servicing rigs wherein the rig proper is made integral with the framework of the vehicle by which the rig is moved about, rather than in the form of a separate drilling or servicing unit mounted on a conventional vehicle.

Various mobile drilling rigs have been proposed heretofore, but these, for the most part, utilized a vehicle having a frame composed of conventional I-beam or box section longitudinal beams on which a more or less standard winch was mounted. This resulted in a unit having a high center of gravity, excessive weight, and hence increased cost of manufacture.

The present construction combines the vehicle frame with the winch frame, with the result that the winch frame is almost completely eliminated, thereby reducing both the weight and the cost, and the center of gravity of the whole unit is lowered, which is highly advantageous for a unit of this type.

An object of this invention is to provide a drilling and servicing unit wherein one frame serves for both the drilling and servicing rig and the frame for the vehicle on which the unit is mounted.

Another object of this invention is to provide a drilling and servicing rig of trussed frame construction wherein the frame of the vehicle serves as the direct mounting frame for the drums of the drilling rig, with at least one drum being interposed between the trussed side frame members.

Still another object of the invention is to provide a trussed vehicle frame, which frame is of the same general character, both for a self-propelled drilling and servicing rig and for a towed or trailer type drilling and servicing rig.

Yet another object of this invention is to provide a self-propelled drilling and servicing rig, the power source of which drives the unit over the ground, which power source may also be utilized for driving the various mechanisms used in the drilling and servicing of wells and the operations incident thereto.

A still further object of this invention is to provide a drilling and servicing rig, the frame of which is braced longitudinally, vertically, transversely and diagonally, so as to provide the maximum structural strength and rigidity with the minimum of weight.

Yet a further object of this invention is to provide a power drive unit which drives through clutches and a transmission to drive the draw-works and the rotary table drives, as well as to provide the power to propel the rig along the ground.

A further object of this invention is to provide a self-contained drilling and servicing rig on a vehicle, including a mast, so that the drilling and servicing rig may be moved onto a well location, the derrick raised, and the device made ready for drilling within a short time.

Yet a further object of the invention is to provide a machine which is sufficiently light in weight, due to the elimination of the winch frame, to comply with highway weight limitations, thus making it possible to move the unit on highways without having to obtain a special permit, or when a permit cannot be obtained.

With these objects in mind, and others that will manifest themselves as the description proceeds, reference is made to the accompanying drawings, in which like reference characters designate like parts in the several views thereof, in which:

Figure 1 is a side elevational view of one form of the invention, with the drilling and servicing rig shown in transport position, and with the drilling position thereof shown in dot-dash outline, with parts broken away to show the details of construction;

Figure 2 is a top plan view of the form of drilling and servicing rig shown in Figure 1, but with the mast removed therefrom;

Figure 2A is a fragmentary side elevational view of the side of the rig opposite that shown in Figure 1;

Figure 3 is an enlarged sectional view taken on the line 3—3 of Figure 1, looking in the direction indicated by the arrows;

Figure 4 is an enlarged sectional view taken on the line 4—4 of Figure 1, looking in the direction indicated by the arrows;

Figure 5 is a top plan view of the structural frame of the form of the invention as shown in Figure 1, but with the machinery removed therefrom;

Figure 6 is a side elevational view of the form of the frame shown in Figure 5, but showing the drilling and servicing rig machinery removed therefrom;

Figure 7 is a cross-sectional view taken on the line 7—7 of Figure 6, looking in the direction indicated by the arrows;

Figure 8 is a cross-sectional view taken on the line 8—8 of Figure 6, looking in the direction indicated by the arrows;

Figure 9 is a side elevational view of a second form of the invention, showing the rig mounted on a trailer frame, the transport position being shown in full outline, and with the mast in raised position being shown in dot-dash outline;

Figure 10 is a top plan view of the form of the invention shown in Figure 9, but with the mast removed therefrom;

Figure 11 is a side elevational view of the fabricated vehicle and drilling and servicing rig frame, showing the bracing thereof;

Figure 12 is a top plan view of the drilling rig frame as shown in Figure 11, with the drilling machinery removed therefrom;

Figure 13 is a cross-sectional view taken on the line 13—13 of Figure 11, looking in the direction indicated by the arrows;

Figure 14 is a cross-sectional view taken on the line 14—14 of Figure 11, looking in the direction indicated by the arrows; and Figure 15 is an enlarged, fragmentary view showing a drive shaft and a counter shaft connected in driving relation.

With more detailed reference to the drawings, Figures 1 through 8, the numeral 1 designates generally a frame of truss type construction for mounting the rig elements. Pairs of wheels 2 are mounted at one end of the frame 1, which wheels are used for steering the vehicle over the road, while pairs of wheels 4 are mounted at the other end of frame 1 and are connected in driving relation with a power unit 6, such as an internal combustion engine, through a torque converter unit 8, drive shaft 10, transmission or gear drive unit 12 and drive shafts 14 and 16, which shafts 10, 14, and 16 each has at least two universal joints 17, 18 and 19, respectively therein, so as to give the proper driving relation to differentials 20 and 22.

The frame 1 is supported on the axles on which wheels 2 and 4 are mounted in a manner well understood in the art.

The transmission or gear drive unit 12 is so constructed that the drive shaft 14 may be selectively engaged so as to provide the traction power for wheels 4 to move the vehicle from place to place, but, when on location, the drive shaft 14 is disengaged and a drive shaft 24 is engaged so as to drive through bevel gear unit 26, which is a second gear drive unit, to drive a counter shaft 28, which countershaft passes transversely therethrough. A drum shaft 34 on which drum 38 is mounted, extends outward on one side of frame 1 and has an air actuated clutch 25 thereon. A sprocket 27 is mounted on and engageable by clutch 25 so as to be in driving relation with clutch 32, when the clutch is engaged. A hydraulic retarder unit, designated generally by the numeral 29, is mounted on frame 1 forward of the drum 38 and has a sprocket 31 on the shaft thereof, which hydraulic retarder unit is of a conventional type, utilizing inversely arranged fins in a driven element and stationary members, so when the driven element is rotated a fluid turbulence will be set up within the casing so as to impede and slow down the driven element. A chain 33 surrounds sprockets 27 and 31 so as to connect the drum 38 in driving relation with the hydraulic brake retarder 29, when the clutch 25 is engaged. The sprockets 27 and 31, as will best be seen in Figure 2, as well as chain 33 are encompassed within a chain housing or guard 35.

The counter shaft 28 has sprockets 41, 42 and 68 thereon (Figures 3, 4). The sprocket 41 is secured to clutch member 48, which clutch member is journaled on counter shaft 28 for rotation thereon, when clutch 50 is disengaged, however, when clutch 50 is engaged, the sprocket 41 rotates with the counter shaft 28 so as to drive drum 38. The drum 38 is mounted on a shaft 34 (Figure 4), which shaft 34 is journaled on bearings 36, which bearings are mounted on frame 1. The drum shaft 34 has an air actuated clutch 32 mounted on one end thereof, upon which clutch is mounted a sprocket 43. A chain 30 surrounds the sprockets 41 and 43, which chain 30 and sprockets 41 and 43 run when the counter shaft 28 is running and clutch 50 is engaged. However, the air actuated clutch 32 may be selectively engaged with sprocket 43 to drive winding drum 38, as desired.

A sprocket 42 is also secured to clutch member 48, which clutch member is journaled on counter shaft 28 and is adapted to be selectively engaged by complementary sliding clutch member 50, so as to drive the sprocket 42, when the clutch is engaged. A drum 52 is mounted on a drum shaft 46, which drum shaft is journaled in bearings 56 mounted on frame 1. A sprocket 44 is mounted on one end of drum shaft 46, sprockets 42 and 44 being connected by a chain 40 so that, upon engagement of sliding clutch member 50 with the clutch member 48, the drum 52 will be driven. The bearings 56 are mounted on upper drum support members 54, slightly above the upper face of trussed frame 1, but with the drum extending down into and between frame members 1, as will best be seen in Figure 3.

Catheads 58 and 59 are mounted on each end of drum shaft 46, as will best be seen in Figures 2 and 3, for purposes well understood in the drilling art. The drums 38 and 52 are used for spooling cable thereon, which cable passes upward over sheaves 60 and 62, on the upper end of mast 64, when the mast is in raised position.

On the opposite end of the counter shaft 28 from complementary clutch members 48—50, is mounted an air actuated clutch 66, which clutch 66 is in driven relation, at all times, with counter shaft 28, and which clutch 66 is selectively engageable with sprocket 68 which is journaled on shaft 28. A bevel gear unit 70 is mounted on frame 1 forwardly of drum 38, which bevel gear unit has a sprocket 72 thereon. A chain 74 surrounds and connects the sprockets 68 and 72, so as to drive the bevel gear unit 70, which unit has a forwardly extending drive shaft 76. The drive shaft 76 has a universal joint 77 thereon to enable the driving of universal shafts 78, which drive through a series of universal joints 79, and which universal shafts 78 connect with a pinion shaft 80 of rotary table 82, thereby enabling the driving of the rotary table 82 by engaging air actuated clutch 66 (Figure 4).

The mast 64 is hinged, as indicated at 84 (Figure 1), and is raised and lowered by means of hydraulic cylinder 86, the fluid for which is supplied by hydraulic pump 88 (Figure 2), in a manner well understood in the art.

An air compressor 90 is connected, in geared relation through belts 92, to drive shaft 94 for supplying air under pressure to the fluid actuated clutches 25, 32, 66 and 96.

The controls for operating the vehicle are located in the cab 98 thereof, while the controls for controlling the various fluid actuated clutches 32, 66, and 96 may be located near the lower extension 100 of mast 64, so that the driller may readily control the drilling and servicing operations.

The engine 6 is located in the opposite end of frame 1, which is remote from the well being serviced or drilled, thereby minimizing fire hazards.

A modified form of the invention is shown in Figures 9 through 14, which also embodies the use of a single truss type frame, constituting both the vehicle frame and the frame in which the hoisting and drilling mechanism is mounted.

The chief difference between the modified form of the invention, as shown in Figures 9 through 14, and the form of the invention as shown in Figures 1 through 8, is that the frame 101 of the modified form of the invention is a semitrailer frame, under which a pair of axles 102 are mounted for supporting the rear end of the frame 101, when that frame is being utilized as a vehicle frame. The forward end of the frame 101 usually has an off-set portion 104 with a coupling pin 106 to enable coupling the forward end of the frame 101 with a tractor or truck, which utilizes a conventional fifth wheel.

Drums 107 and 108 are mounted on shafts 109 and 110. Shaft 109 is journaled in bearings 111, which bearings 111 seat on beam members 113. The shaft 110 is journaled in bearings 112, which bearings 112 seat upon the upper flanged face of the structural frame member 114 of the frame 101. A lower frame member 116 is spaced downward from frame member 114 and is held in spaced relation by vertical braces 118 and diagonal braces 120, so as to form a truss type construction. In this manner, the chords 114 and 116 are spaced apart sufficiently, and are braced by braces 118 and 120 to enable the load to be distributed to wheels 122 which are mounted on axles 102, and to the forward end of the off-set portion 104, when the frame 101 is being used as a trailer and when the frame is being used as a rig structure in the drilling and servicing of wells. Screw jacks 124 are screwed downward to engage a foundation, in such manner as to level the rig structure, with the trussed frame members carrying the weight to each of the supporting screw members 124.

An engine 126 is mounted on the upper face of structural members 114, as will best be seen in Figures 9 and 10, which engine has a sprocket 128 on the drive shaft thereof, so as to drive through chain 130 to a sprocket 132 which is mounted on the shaft of clutch 134. The clutch 134 drives through shaft 136 to drive through a chain 137 which surrounds sprockets 137a and 137b, which sprockets are mounted on the shaft 136 and on countershaft 138, respectively, so as to form a chain and sprocket drive between shaft 136 and countershaft 138, which sprockets and chain are encased within a housing 137c to form a gear drive unit. A sprocket 139 is mounted on the outer end of countershaft 138 so that chain 140 which passes around sprockets 139 and 141 on the countershaft 138 and drum shaft 109, respectively, will drive the drum 107. A chain 142 passes around sprocket 143 on countershaft 138 and sprocket 145 on drum shaft 110, so as to drive the drum 108, in a manner well understood in the hoisting art.

Air actuated clutches 144 and 146 are shown on each end of drum shaft 110, so as to be selectively engaged to give the desired speed for driving the drum 108.

The shaft 136 extends inward from the clutch 134 and has a hydraulic or fluid type brake retarder 148, which is engaged with the shaft by a positive clutch 150, as will be seen in Figure 10. This enables a drum to be selectively connected to the hydraulic brake or retarder 148 which will enable heavy weights, such as pipe and the like, to be lowered into the well with a minimum of wear on the friction barkes (not shown) which surround the brake flanges of drums 107 and 108.

A mast 152 is hingeably connected to upright standards 154 so the derrick may be raised from prone position, as shown in full outline in Figure 9, to the upright position as shown in dot-dash outline therein. The mast 152 may be raised and lowered by telescoping hydraulic cylinder 156, with the usual hydraulic fluid under pressure, being furnished by a hydraulic pump to extend the cylinder, as indicated in dot-dash outline in Figure 9.

It is to be pointed out that the power unit and the drawworks of the present combination trailer and drilling rig are built integral with the frame 101, in a manner similar to that described for the mobile unit, as shown in Figures 1 through 8 and described above. However, the present modified form of the invention allows the tractor to be released for other duties, once the trailer and rig unit are on the well location. A rig constructed in this manner can be produced at a minimum cost, and with considerable reduction in weight over the conventional manner of constructing a rig, that is, constructing a semi-trailer as one unit, and a drilling rig with the frame and bracing therefor as a separate unit.

It is believed that these advantages are readily apparent as it is the purpose of this invention to produce equipment that will drill deeper, but at the same time be lighter in weight, and which may be transported into remote and relatively inaccessible locations with a minimum of time and effort. In construction of the present unit, cognizance has been given to laws regulating the weight of equipment that may be transported over the highways.

As will best be seen in Figures 11 through 14, the frame 101 is braced with both vertical and diagonal braces 118 and 120 and also transversely with diagonal braces 121, as best seen in Figure 14. This makes possible the use of lighter weight "boxed" angle members which are welded together to form frame members with the maximum strength with the minimum weight. Further transverse braces 119 and 119a are provided intermediate frame members 114 and 116, respectively, which results in a construction of greatest strength per pound of metal, much more so than would be possible in utilizing solid beams or in building separate frame structures for both trailer and drilling and servicing unit.

While the invention has been described in some detail and illustrated in two forms thereof, it is to be understood that changes may be made in the minor details of construction without departing from the spirit of the invention or the scope of the appended claims.

Having thus described the invention, what is claimed is:

1. In a mobile well drilling and servicing rig, an elongated, integrally constructed frame, which frame has at least two spaced apart side members, at least two axles mounted transversely on the lower portion of said frame, one near each end thereof and secured thereto, a wheel mounted on each end of each of said axles, a prime mover mounted on said frame, a bearing mounted on a side of each of said side members intermediate the ends thereof, which bearings are in axially aligned relation, a drum shaft extending transversely of said frame and being journaled in said bearings on said side members, a drum, which drum is substantially the width of the space between said side members, mounted on said drum shaft, a sprocket mounted on said drum shaft exterior of one of said side members and being selectively connectable with said shaft, a gear drive unit positioned within the confines of said frame and having a countershaft extending outward therefrom transversely of said frame, bearings mounted on said countershaft on at least one of said side members, a sprocket mounted on said countershaft, exterior of said frame, and being in aligned, driving relation with said sprocket on said drum shaft, means connecting said prime mover and said gear drive unit in selected driving relation to selectively rotate said drum shaft, and means selectively connecting said wheels of said drilling and servicing rig with said prime mover in driving relation.

2. A device as defined in claim 1; wherein an air actuated clutch is mounted on said drum shaft exterior of said frame, said sprocket on said drum shaft being connected to said air actuated clutch, and wherein remote control means is connected with said air actuated clutch for selectively engaging said air actuated clutch in driving relation with said countershaft.

3. In a mobile well drilling and servicing rig, an elongated, integrally constructed frame, which frame has at least two spaced apart side members, at least two axles mounted on the lower portion of said frame near an end thereof and secured thereto, a wheel mounted on each end of each of said axles, a prime mover mounted on said frame transversely thereof, the drive shaft of said prime mover extending to a point exterior of said frame, a gear drive unit mounted on said frame, which gear drive unit has a transverse shaft extending therethrough and to a point exterior of said frame and being in parallel relation with the drive shaft of said prime mover, endless power transmission means connecting said drive shaft of said prime mover and said transversely arranged shaft of said gear drive unit in driving relation exterior of said frame, drum shaft bearings mounted on the upper side of each of said side members, a drum shaft journaled in said drum shaft bearings and having at least one end thereof exterior of one of said side members, a cable winding drum, substantially the width of the space between said side members, mounted on said drum shaft, a transversely arranged countershaft extending outwardly from said gear drive unit to the exterior of said frame and being in parallel relation to said drum shaft, endless transmission means connecting said countershaft and said drum shaft in driving relation exterior of said elongated frame, and an air clutch mounted on said drum shaft exterior of said frame to selectively engage said clutch with said transversely arranged countershaft.

References Cited in the file of this patent

UNITED STATES PATENTS

| | | |
|---|---|---|
| 1,191,992 | Peters | July 25, 1916 |
| 1,665,365 | Hunt et al. | Apr. 10, 1928 |
| 1,962,497 | Francis | June 12, 1934 |
| 2,052,301 | Johansen | Aug. 25, 1936 |
| 2,485,500 | Lyman | Oct. 18, 1949 |
| 2,568,959 | Illies | Sept. 25, 1951 |
| 2,594,847 | Bates et al. | Apr. 29, 1952 |
| 2,656,152 | Moon | Oct. 20, 1953 |
| 2,660,268 | Selberg | Nov. 24, 1953 |
| 2,752,121 | Marcotte | June 26, 1956 |
| 2,808,911 | McLerran | Oct. 8, 1957 |